(12) United States Patent
Jia et al.

(10) Patent No.: US 7,261,873 B2
(45) Date of Patent: Aug. 28, 2007

(54) POWER GENERATION FROM SULPHUR-CONTAINING FUELS

(75) Inventors: Charles Q. Jia, Toronto (CA); Donald W. Kirk, Bolton (CA)

(73) Assignee: Enflow Power Generation Inc., Toronto, Ontario (CA)

( * ) Notice: Subject to any disclaimer, the term of this patent is extended or adjusted under 35 U.S.C. 154(b) by 126 days.

(21) Appl. No.: 10/681,209

(22) Filed: Oct. 9, 2003

(65) Prior Publication Data

US 2004/0109820 A1   Jun. 10, 2004

(30) Foreign Application Priority Data

Dec. 4, 2002  (CA)  .................................. 2413563

(51) Int. Cl.
  *C01B 17/02* (2006.01)
(52) U.S. Cl. ...................................... 423/569; 423/570
(58) Field of Classification Search ................ 423/569, 423/570, 244.01
  See application file for complete search history.

(56) References Cited

U.S. PATENT DOCUMENTS

| | | | | | |
|---|---|---|---|---|---|
| 1,908,873 | A | * | 5/1933 | Tyrer | ........................... 423/569 |
| 4,041,141 | A | * | 8/1977 | Moss | ........................... 423/571 |
| 4,066,738 | A | * | 1/1978 | Daman | ........................ 423/569 |
| 4,117,100 | A | * | 9/1978 | Hellmer et al. | ............. 423/569 |
| 4,147,762 | A | | 4/1979 | Steiner | |
| 4,164,555 | A | * | 8/1979 | Steiner | ....................... 423/569 |
| 4,328,201 | A | * | 5/1982 | Steiner et al. | .............. 423/569 |
| 4,421,732 | A | * | 12/1983 | Komuro et al. | ............. 423/569 |
| 4,427,642 | A | * | 1/1984 | Arashi et al. | ............... 423/460 |
| 4,477,426 | A | | 10/1984 | Raskin | |
| 4,702,899 | A | | 10/1987 | Barczak et al. | |
| 5,242,673 | A | * | 9/1993 | Flytzani-Stephanopoulos et al. | ........................... 423/570 |
| 6,030,592 | A | * | 2/2000 | Lu et al. | ................. 423/243.01 |
| 6,932,956 | B2 | * | 8/2005 | Jia | .............................. 423/569 |

FOREIGN PATENT DOCUMENTS

| | | |
|---|---|---|
| GB | 437236 | 10/1935 |
| GB | 525730 | 9/1940 |
| GB | 1 470 150 | 4/1977 |

OTHER PUBLICATIONS

International Search Report for PCT/CA 03/01570, with mailed date of Feb. 11, 2004.*

* cited by examiner

*Primary Examiner*—Steven Bos
(74) *Attorney, Agent, or Firm*—Jeffrey S. Melcher; Manelli Denison & Selter, PLLC

(57) ABSTRACT

A process for obtaining energy values contained in a sulphur-containing carbonaceous fuel, the process comprising (a) treating a feed carbonaceous fuel having a first bound-sulphur content with an effective amount of an oxygen and $SO_2$-containing gas in a reactor at an effective temperature to (i) provide elemental sulphur from the $SO_2$, (ii) release exothermic heat, and (iii) produce a hot effluent gaseous steam containing the elemental sulphur and treated fuel having a second bound-sulphur content, (b) separating the elemental sulphur from the treated fuel; (c) collecting the elemental sulphur; (d) collecting the treated fuel; and (e) collecting the exothermic heat.

14 Claims, 1 Drawing Sheet

POWER GENERATION FROM SULPHUR-CONTAINING FUELS

FIELD OF THE INVENTION

This invention relates to the utilization of the heat released from the combustion of high sulphur-containing carbonaceous fuels such as, coal and petroleum.

BACKGROUND TO THE INVENTION

Two main types of petroleum coke are produced as by products from oil bearing materials in the "so-called" upgrading process, namely, delayed coke and fluid/flexi coke. In view of only minor differences between fluid coke and flexi coke, they are often grouped together under the name of "fluid coke". Due to the difference in the production technology employed, particularly in process temperature, a typical fluid coke has a lower volatiles content, a higher bulk density, higher sulphur (ca 8%) and ash content than a typical delayed coke. Physically, fluid coke comprises particles having a particle size of about 200 μm in diameter with an onion-like layered structure, while delayed coke is produced in the form of large lumps.

Worldwide production of delayed coke exceeds fluid coke by several times. In Western Canada, daily production of oil sands fluid coke exceeds 6000 tonnes. Mainly due to its high sulphur content, almost all fluid coke produced is being landfilled and added to the existing stockpiles of about 45 million tonnes. It has been suggested that the fluid/flexi coking is "a front runner" among technologies for upgrading heavy crude to transportation fuel (Furimsky, 2000). Moreover, it was predicted that the production of petroleum coke would increase as a result of the increased amount of lower-quality high-sulphur crude oils treated (Swain, 1997). An increase in sulphur in coke is also anticipated, as more sulphur has to be rejected to meet the increasingly strict regulations on sulphur in transportation fuel. Clearly, there is a need to develop new, preferably, beneficial uses for high-sulphur petroleum coke, particularly fluid coke.

As is well known in the field, fluid coke produced at high temperature is refractory, in that it has a graphitic or glassy surface and is considered unreactive. For example, this type of unreactive coke is produced when sulphur containing coal or oil is pyrolysed to produce volatile gases as fuels and residual refractory coke. The sulphur containing refractory coke has limited use in that although the coke can be combusted as a fuel, upon combustion, the sulphur is converted to waste gas-containing sulphur dioxide, which gas must be treated to prevent release of the sulphur dioxide to the environment.

Sulphur content is at the centre of the challenges to using petroleum coke and invariably determines the end market for the coke. Low sulphur coke (<2 wt %) is often used for the production of anodes and other high value products, while a coke with 2 to 5 wt % S is considered to be fuel grade. Although fluid coke constitutes a significant energy source having very high heating values (32-35 MJ/kg), its utilization as a solid fuel in conventional pulverized coal (PC) burners is limited and, more often, prevented by the heavy burden added on traditional lime/limestone-based flue gas desulphurization (FGD).

According to Anthony (1995), it was concluded that "fluidized bed combustion (FBC) is the best, and only available technology for burning alternative fuels" with elevated sulphur levels, such as petroleum coke. In a FBC boiler, sulphur and nitrogen are captured during combustion and become part of the ash produced. However, FBC is not a de-NOx and de-SOx technology for treating flue gas. Limestone is often added at a typical Ca/S ratio of 2 to capture sulphur. Despite the reported high efficiency, sulphur capture in FBC remains one of the key issues in improving economics of the technology. Other limitations identified with FBC include fireside fouling that is closely linked to high sulphur in fuel (Anthony and Jia, 2000). Further, ash production and disposal problems are related to sulphur content. Desulphurization prior to utilization has also been studied. Unlike coal, sulphur in coke is largely organic in nature. Mechanisms of desulphurization, therefore, involve the cleavage of C—S bonds. In 1970's, Tollefson's group in Calgary pioneered the desulphurization of coke using hydrogen, and later improved the efficiency with ground coke particles and NaOH. It was found that fluid coke was more resistant to desulphurization than delayed coke. Molten caustic leaching, which was originally developed for removing organic sulphur in coal, was applied to both fluid and delayed coke at 200 to 400 C, resulting in less than 1% of sulphur (Ityokumbul, 1994). It was found, however, that no process developed so far had proven to be economically viable. Recently, Furimsky (1999) suggested that gasification could emerge as another alternative for utilizing petroleum residues, including coke. A group at Tohuku University investigated gasification with various metal hydroxide catalysts (Yamauchi et al., 1999). In two separate studies carried out in England and Spain, petroleum coke was added to a typical industrial coal blend used in the production of metallurgical coke (Barriocanal et al., 1995; Alvarez et al., 1998). At the University of Alabama, petroleum coke was tested for remediating Sucamoochee soil (15 wt % oil) via a two-step agglomeration process (Prasad et al., 1999). Under the optimal condition, the remaining oil content in the soil was found to be below 200 ppm.

It is known that $SO_2$ can be converted into elemental sulphur with reducing agents and a number of processes have been proposed for this purpose. As a group, they are termed "SP-FGD" (sulphur-producing flue gas desulphurization). Some examples are the coal-based Foster Wheeler process (U.S. Pat. No. 4,147,762), the BaS/SO4-based cyclic process (M.Olper and M.Maccagni "Removal of $SO_2$ from Flue Gas and Recovery of Elemental Sulfur" Euro. Pat. Appl. No. 728,698 28 Aug. 1996), the Claus reaction-based McMaster-INCO process (U.S. Pat. No. 6,030,592) and the $Na_2S$(aq)-based low-temperature process (Siu and Jia, 1999; Siu, 1999). To reduce $SO_2$ to sulphur, $CH_4$, $H_2$ and CO gases are also used, often with a catalyst. A recently example is the CO-based process developed at MIT, in which a cerium oxide-containing catalyst is used (U.S. Pat. No. 5,242,673).

SUMMARY OF THE INVENTION

It is an object of the present invention to provide a process for the utilization of the heat generated by the combustion of high sulphur-containing carbonaceous fuels.

It is a preferred object to produce an essentially closed-loop sulphur dioxide removal and regeneration recycle process as hereinabove promised, which is environmentally friendly.

Accordingly, in a broad aspect the invention provides a process for obtaining energy values contained in a sulphur-containing carbonaceous fuel, said process comprising
  (a) treating a feed carbonaceous fuel having a first bound-sulphur content with an effective amount of an oxygen and $SO_2$-containing gas in a reactor at an effective temperature to (i) provide elemental sulphur from said $SO_2$,
(ii) release exothermic heat, and
(iii) produce a hot effluent gaseous steam containing said elemental sulphur and treated fuel having a second bound-sulphur content;
(b) separating said elemental sulphur from said treated fuel;
(c) collecting said elemental sulphur;
(d) collecting said treated fuel; and
(e) collecting said exothermic heat.

In a preferred process, the invention provides a process for obtaining energy values contained in sulphur-containing carbonaceous fuel, said process comprising
(a) burning a first sulphur-containing carbonaceous fuel in an oxygen-containing gas in a combustion boiler to produce
(i) exothermic heat; and
(ii) a first combustion oxygen-lean gaseous stream comprising sulphur dioxide;
(b) collecting said exothermic heat;
(c) feeding said first combustion gaseous stream to a reactor containing a second sulphur-containing carbonaceous fuel having a first bound-sulphur content;
(d) reacting said second fuel with said first combustion gas in an oxygen-containing atmosphere at an effective temperature to
(i) produce elemental sulphur from said $SO_2$;
(ii) release reactor exothermic heat; and
(iii) produce a second combustion gaseous steam containing said elemental sulphur and a treated fuel having a second bound-sulphur content;
(e) separating said elemental sulphur from said treated fuel;
(f) collecting said elemental sulphur;
(g) collecting said treated fuel; and
(h) producing a separated combustion stream.

The effective temperature in the reactor is preferably between 400° C.-800° C. Further, the first combustion gas may be cooled to the effective temperature. Also, the sulphur content of the carbonaceous fuel is greater than 3% w/w, and the separated treated fuel preferably contains at least 8% w/w bound sulphur. In a further preferred embodiment, the carbonaceous fuel is selected from the group consisting of coal and petroleum coke containing at least 5% w/w sulphur.

In the processes hereinabove defined, the $SO_2$ is, preferably, produced by the oxidation of the bound-sulphur fuel in the combustion boiler with a slight excess of oxygen, typically, 10% V/V stoichiometric excess, to provide maximum burning of the fuel for maximum exothermic heat generation, commensurate with maximum $SO_2$ production but having a resultant oxygen-lean gaseous stream for subsequent combustion with additional sulphur-bound carbonaceous fuel to effect production of $CO_2$ and reduction of the $SO_2$ to elemental sulphur.

Although elemental sulphur is produced, separated from the treated fuel and collected, the sulphur content of the treated fuel is generally higher than in the second fuel used to produce the treated fuel. The treated fuel is, preferably, cycled back to the reactor and most preferably, to the combustion boiler for maximum combustion and extrusion of its energy values.

Cooled (150-250° C.) treated fuel is most preferably used as a scrubber material to absorb any $SO_x$ and $NO_x$ contained in the separated combustion steam prior to discharge to atmosphere.

BRIEF DESCRIPTION OF THE DRAWINGS

In order that the invention may be better understood, preferred embodiments will now be described, by way of example only, with reference to the drawing wherein the FIGURE is a diagrammatic block flow diagram of an apparatus and process according to the invention.

DETAILED DESCRIPTION OF THE DRAWINGS

Figure 1:
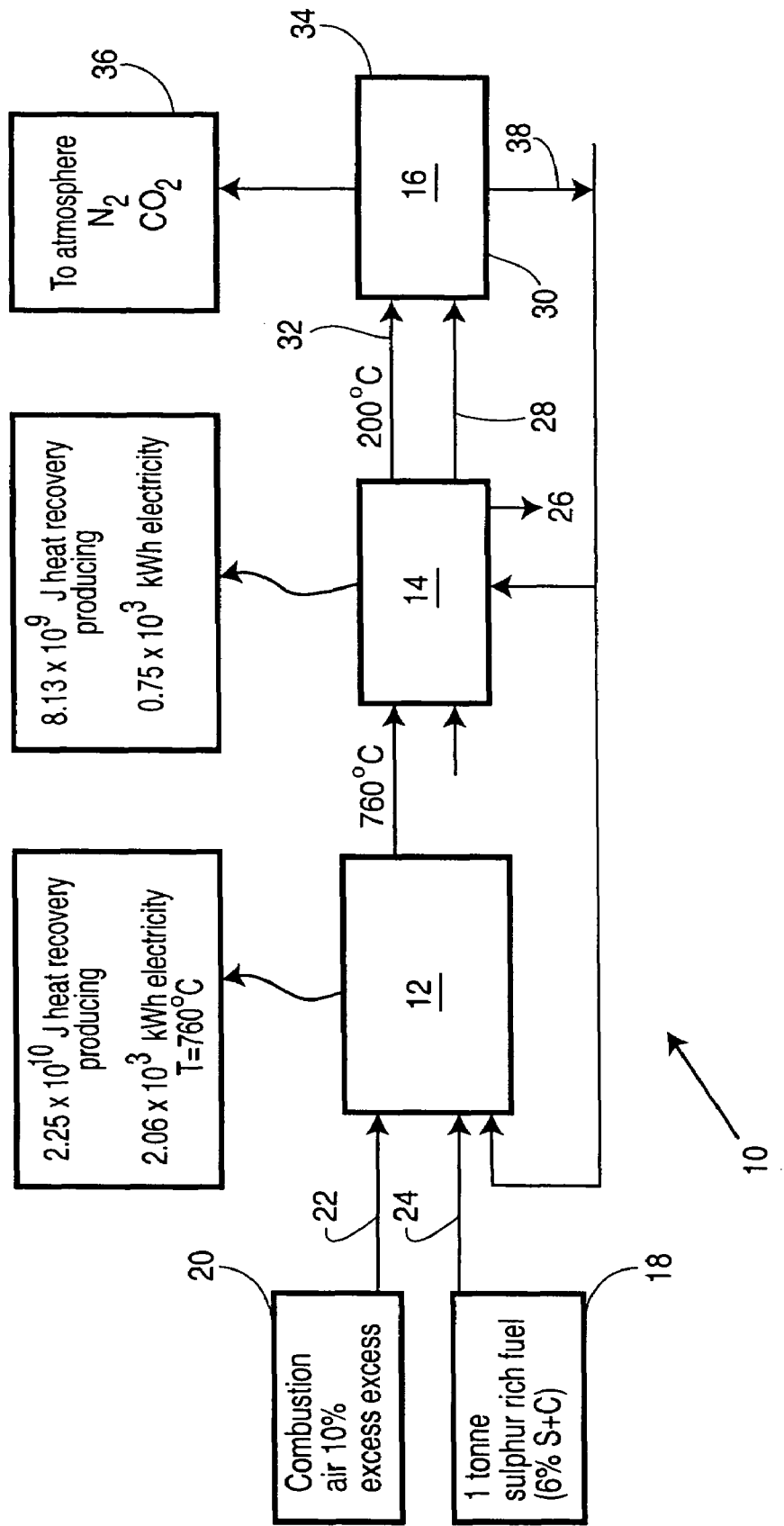
FIG. 1 is a diagrammatic block flow diagram of an apparatus and process according to the invention.

Sulphur Rich Fuel 1.

The FIGURE shows generally as 10 a carbonaceous fuel-burning superheated steam generating apparatus and process having a steam generating combustion boiler 12, a steam generating reactor 14 and a gaseous pollutant scrubber 16.

Sulphur rich carbonaceous fuel (fluid coke 1 tonne; 6% w/w S)18 is fed as stream 24 to boiler 12 and burnt in a 10% stoichiometric excess oxygen atmosphere 20, fed as stream 22, to produce a first combustion oxygen-lean gaseous stream 50 at 760° C. containing
78.3 Kmol $CO_2$,
1.875 Kmol $SO_2$, in
8.02 Kmol $O_2$ and 332.0 Kmol $N_2$,
$2.25 \times 10^{10}$ J heat is recovered which generates $2.06 \times 10^3$ KWh electricity, on a 33% thermal energy conversion factor.

Reactor 14 receives gaseous stream 50 and additional fluid coke (6% w/w S, 94% C) feed 25, wherein the oxygen in stream 22 is used up by coke 25 to form additional $CO_2$ and wherein the $SO_2$ is reduced by the coke 25 to elemental sulphur 26 and treated coke 28. These reactions are exothermic and produce $8.3 \times 10^3$ J of high grade heat which generates $0.75 \times 10^3$ KWh electricity.

In alternative embodiments, additional oxygen (air) and/or $SO_2$ (not shown) additional to that contained in stream 22 may be injected into reactor 14.

Thus, the coke 25 introduced into reactor 14 serves initially to remove residual oxygen, but then reduces the $SO_2$ to produce elemental sulphur, $CO_2$ and treated coke or activated carbon 28.

Exhaust gas 32 as a combustion gaseous stream exiting reactor 14, Is cooled to provide superheated steam for electricity generation, to a temperature of about 200° C. and subsequently cooled further to about 120° C. to condense the elemental sulphur for removal as product 26.

Exhaust gas 32, now with elemental sulphur removed, is passed to a scrubber 16 containing all or a portion of treated coke 28, which generally contains at least 10% w/w S and absorbs any SOx contaminants to provide an environmentally acceptable off-gas 36 and contaminated coke 38.

Subsequently, contaminated coke 38 is cycled to, most preferably, combustion boiler 12, or as feed to reactor 14.

Thus, the aforesaid embodiment according to the invention provides for the combustion of high sulphur carbonaceous fuel for electricity generation, with no environmentally unacceptable gaseous discharge of pollutants or disposal of landfill of any carbonaceous materials.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

The invention claimed is:

1. A process for obtaining energy values contained in sulphur-containing carbonaceous fuel, said process comprising
   (a) burning a first sulphur-containing carbonaceous fuel in an oxygen-containing gas in a combustion boiler to produce
      (i) exothermic heat; and
      (ii) a first combustion oxygen-lean gaseous stream comprising sulphur dioxide;
   (b) collecting said exothermic heat;
   (c) feeding said first combustion gaseous stream to a reactor containing a second sulphur-containing carbonaceous fuel having a first bound-sulphur content;
   (d) reacting said second fuel with said first combustion gas in an oxygen-containing atmosphere at an effective temperature to
      (i) produce elemental sulphur from said $SO_2$;
      (ii) release reactor exothermic heat; and
      (iii) produce a second combustion gaseous stream containing said elemental sulphur and a treated fuel having a second bound-sulphur content;
   (e) separating said elemental sulphur from said treated fuel;
   (f) collecting said elemental sulphur;
   (g) collecting said treated fuel; and
   (h) producing a separated combustion stream.

2. A process as defined in claim 1 wherein said second bound-sulphur content is higher than said first bound-sulphur content.

3. A process as defined in claim 1 wherein said treated fuel is recycled back to said reactor.

4. A process as defined in claim 1 further comprising collecting said reactor exothermic heat.

5. A process as defined in claim 1 further comprising passing said separated combustion stream through an effective amount of said separated treated fuel at a temperature lower than said reactor temperature to effect absorption of any residual $SO_2$ in said separated combustion stream and provide essentially $SO_2$-free off-gas.

6. A process as defined in claim 1 further comprising cycling said separated treated fuel to said combustion boiler and/or said reactor.

7. A process as defined in claim 1 wherein said first combustion gaseous stream is cooled to said effective temperature.

8. A process as defined in claim 1 wherein said effective temperature in said reactor is from 400° C.-800° C.

9. A process as defined in claim 1 wherein said treated fuel has a higher sulphur content than said fuel.

10. A process as defined in claim 5 wherein said temperature of said separated treated fuel is from 150-250° C.

11. A process as defined in claim 1, wherein said sulphur content in said carbonaceous fuels is greater than 3% w/w.

12. A process as defined in claim 1 wherein said separated treated fuel contains at least 8% w/w bound sulphur.

13. A process as defined in claim 1, wherein said carbonaceous fuel is selected from the group consisting of coal and petroleum coke-containing at least 5% w/w S.

14. A process as defined in claim 13 wherein said petroleum coke is fluid coke.

* * * * *